United States Patent
Hardy et al.

[15] 3,655,418
[45] Apr. 11, 1972

[54] PRODUCTION OF PIGMENTS

[72] Inventors: Clarence James Hardy, Wantage; Edward Sydney Lane, Didcot; Mervyn John Hannam, East Hendred, all of England

[73] Assignee: United Kingdom Atomic Energy Authority, London, England

[22] Filed: Aug. 14, 1969

[21] Appl. No.: 850,217

[30] Foreign Application Priority Data

Aug. 20, 1968   Great Britain......................39,748/68

[52] U.S. Cl............................106/304, 106/308 Q, 106/309
[51] Int. Cl........................................C09c 1/24, C08h 17/04
[58] Field of Search................106/304, 308 Q, 193 J, 308 P, 106/308 C, 308 M, 309; 252/62.56

[56] References Cited

UNITED STATES PATENTS

| | | | |
|---|---|---|---|
| 1,854,744 | 4/1932 | Jones | 106/308 C |
| 2,811,463 | 10/1957 | Burgyan | 106/304 |

FOREIGN PATENTS OR APPLICATIONS

| | | | |
|---|---|---|---|
| 1,219,612 | 6/1966 | Germany | 106/304 |

*Primary Examiner*—Tobias E. Levow
*Assistant Examiner*—J. V. Howard
*Attorney*—Larson, Taylor & Hinds

[57] ABSTRACT

A route for the production of a black pigment comprises making an aqueous solution of iron and manganese salts and reacting it with a base in the presence of a protective colloid to produce a granular precipitate. The colloid is preferably in the base but it may also be in the salt solution.

10 Claims, No Drawings

PRODUCTION OF PIGMENTS

The present invention relates to the production of pigments and more specifically to the production of a black or dark grey pigment which is stable at high temperatures. It has heretofore been proposed to use black pigments based on magnetite but unfortunately these pigments decompose to ferric oxide at temperatures above 180° C. and since ferric oxide is brown in color this means that the black pigment is not stable. It has also been proposed to use a mixture of iron oxide and manganese oxide as a block pigment, the mixture being color stable up to temperatures of the order of 800° C. but unfortunately the preparation of such pigments has hitherto been complex, a route being described in British Pat. No. 1,082,847.

It is an object of the present invention to provide a new or improved route for the manufacture of iron-oxide-manganese-oxide pigments.

According to the present invention there is provided a process for the production of a pigment, comprising forming an aqueous solution containing water-soluble iron and manganese salts, introducing such aqueous salt solution into an aqueous solution of a base in the presence of a protective colloid thereby to form discrete particles, and filtering, washing and calcining such particles.

More specifically the soluble iron salts which may be used are ferric nitrate, ferric chloride and ferrous sulphate and the soluble manganese salts are conveniently manganese nitrate or manganese sulphate. For cheapness it is convenient to generate manganese sulphate by reaction of manganese dioxide with sulphuric acid in the presence of an easily reduced organic reactant, such as formaldehyde. The manganese sulphate does not have to be used with ferric sulphate but can be used with the chloride which is also cheap.

A solution is made up containing the iron and manganese salts in the required proportions and then this solution is dropped into a solution of a base such as ammonia or sodium hydroxide.

The protective colloid may be present either in the solution of salts or in the base, the latter being preferred. The use of protective colloids in the salt solution is to some extent disclosed in our copending U.K. application No. 15525/66, issued as British Pat. No. 1,175,834.

The protective colloid is a water-soluble organic polymeric compound and may for example be a polyhydroxy compound such as dextran, a cellulose derivative, polyvinyl alcohol or starch, a polycarboxylic compound such as Rohafloc L2 (a methacrylate polymer), a polycarbonamide compound such as Polyflok 4D (an anionic acrylic polymer), a polyamine compound such as gelatin or a mixture of these compounds.

On dropping the salt solution into the base generally spherical particles of gel are formed, this gel being either the hydroxide or the basic sulphate. After standing in the base for a sufficient length of time the gel particles are relatively hard and may be filtered without difficulty. The particles may then be washed or even leached to remove unwanted ions, although a considerable percentage of sulphate and/or sodium ions can be tolerated in the final product.

The gel particles are then conveniently dried for several hours at a temperature below 100° C. to remove excess water and allow further oxidation. If desired and if based on nitrate solutions, they may be denitrated at a temperature of about 500° C. They may then be calcined in air at a temperature in the range 750°–850° C. to develop a stable black pigment. This pigment shows no color change after being heated to 850° C. and re-cooled.

The ratio of iron to manganese by weight is conveniently in the range 3:1 to 12:1, the color varying from deep grey to black with increasing manganese content.

It will be appreciated that the technique described enables filtering and washing to be carried out quickly, easily and effectively in contrast to a conventional co-precipitation route in which formation of finely divided gelatinous precipitates leads to loss of manganese as a filter-passing colloid and blocking of the filters by iron hydroxide.

The product is relatively soft and after calcining can be ground or ball milled easily to reduce its particle size to the required value.

In order that the present invention may more readily be understood, certain examples of preparations in accordance with the same will now be described.

EXAMPLE 1

500 g. of ferric nitrate ($FE(NO_3)_3, 9H_2O$) and 45 g. of manganese nitrate ($Mn(NO_3)_2, 6H_2O$) were dissolved in 1 liter of water. This solution was sprayed through a hypodermic needle into 2 liters of a solution of 50 percent 0.880 ammonia in water containing 40 g. of soluble starch. The ammonia was stirred until the reaction was completed and the precipitate allowed to settle overnight. The precipitate was then retained on a sintered filter plate and washed with four times its volume of water, before being tray dried for 18 hours in a circulating hot air oven at 95° C. The material was heated in air at 500° C. for 1 hour to remove nitrate, and finally calcined at 800° C. for 1 hour to produce a black pigment with an iron to manganese ration (by weight) of 8:1/

EXAMPLE 2

350 g. of ferrous sulphate ($FeSO_4, 7H_2O$) and 66 g. of manganese sulphate ($MnSO_4, H_2O$) were dissolved in 1 liter of water and added to a solution of 200 g. of sodium hydroxide and 10 g. of soluble starch dissolved in 1 liter of water and held at 70° C. The gel precipitate was filtered and washed once with its own volume of water. It was then dried for 24 hours in air at 95° C. on shallow trays to aid oxidation. The product was finally calcined for 2 hours in air at 850° C. The pigment had an iron to manganese ratio (by weight) of 3.3:1 and an analysis of 41.5 $^w$/o iron, 12.7 $^w$/o Mn, 11 $^w$/o $SO_4$, 6 $^w$/o Na.

EXAMPLE 3

20 g. of manganese dioxide was boiled with 300 ml. of water containing 30 ml. of concentrated sulphuric acid. 50 ml. of formaldehyde solution (35 g. per 100 ml.) was slowly added to aid the dissolution of the manganese dioxide. 270.3 g. of ferric chloride hexahydrate dissolved in 500 ml. of water was then added. 20 g. of Rohafloc L2 was stirred in until the mixture was homogeneous. The mixture was sprayed through an atomiser into 2 liters of 8M ammonia containing 2 percent by volume of Rohafloc L2. The precipitate was treated as described in Example 1 to give a black pigment.

EXAMPLE 4

20 g. of manganese dioxide was boiled with 300 ml. of water containing 30 ml. of concentrated sulphuric acid. 50 ml. of formaldehyde solution (35 g. per 100 ml.) was slowly added to aid the dissolution of the manganese dioxide. 270.3 g. of ferric chloride hexahydrate dissolved in 500 ml. of water was then added and the mixture sprayed into 2 liters of 8M ammonia containing 40 g. of soluble starch. The precipitate was treated as described in Example 1 to give a black pigment.

We claim:

1. A process for the production of a pigment comprising forming an aqueous solution containing water-soluble iron and manganese salts, forming the said aqueous salt solution into a plurality of discrete particles, gelling the particles by contacting them with an aqueous solution of a base in the presence of a protective colloid, filtering the gelled particles, washing the filtered particles and calcining the washed particles.

2. The process of claim 1, wherein said aqueous salt solution is formed by dissolving manganese dioxide in dilute sulphuric acid and adding a ferric salt.

3. The process of claim 1, wherein the protective colloid is present in the aqueous base solution.

4. The process of claim 1, wherein the protective colloid is selected from the group of water-soluble organic compounds consisting of polyhydroxy compounds, polycarboxylic compounds, polycarbonamide compounds and polyamine compounds.

5. A process according to claim 4, wherein the colloid is selected from the group consisting of dextran, water-soluble cellulose derivatives, polyvinyl alcohol water-soluble starch derivatives, water-soluble methacrylate polymers, and gelatin.

6. The process of claim 1, wherein the precipitate is leached to reduce the proportion of unwanted ions.

7. The process of claim 1, wherein the precipitate is dried at a temperature below 100° C.

8. The process of claim 1, wherein the precipitate contains nitrate ions and is denitrated at a temperature of about 500° C.

9. The process of claim 1, wherein the precipitate is calcined in air at 750°–850° C.

10. The process of claim 1, wherein the ratio of iron to manganese is in the range 3:1 to 12:1 by weight.

* * * * *